United States Patent [19]
Kollross et al.

[11] Patent Number: 5,100,364
[45] Date of Patent: Mar. 31, 1992

[54] PROCESS AND DEVICE FOR THE MECHANIZED SUSPENSION OF SAUSAGES

[76] Inventors: Gunter Kollross, Am Wallerstadter Weg 20, 6080 Gross Gerau-Dornheim; Fritz Steinbis, Helwigstrasse 64, 6080 Gross Gerau, both of Fed. Rep. of Germany

[21] Appl. No.: 604,499

[22] Filed: Oct. 29, 1990

[30] Foreign Application Priority Data

Oct. 27, 1989 [DE] Fed. Rep. of Germany ....... 3935746

[51] Int. Cl.⁵ ................................................ A23C 13/02
[52] U.S. Cl. .................................... 452/185; 452/186; 452/51
[58] Field of Search .................. 452/185 G, 51, 186

[56] References Cited

U.S. PATENT DOCUMENTS

| | | | |
|---|---|---|---|
| 4,612,684 | 9/1986 | Kollross | 452/51 |
| 4,644,607 | 2/1987 | Sziede | 452/51 |
| 4,694,537 | 9/1987 | Kollross | 452/51 |

FOREIGN PATENT DOCUMENTS

| | | | |
|---|---|---|---|
| 3437830 | 4/1986 | Fed. Rep. of Germany | 452/186 |
| 3930876 | 7/1990 | Fed. Rep. of Germany | 452/186 |

*Primary Examiner*—Bruce M. Kisliuk
*Assistant Examiner*—Lawrence Cruz
*Attorney, Agent, or Firm*—Larson and Taylor

[57] ABSTRACT

A process for the mechanized suspended on smoking or cooking rods of individual sausages produced in an automatic filling installation with teardrop-shaped suspension loops fastened to their ends is characterized in that following the picking up by a first pair of conveyor elements from the discharge area of the filling pipe the teardrop-shaped suspension loops are raised up and are simultaneously flared, whereupon the flared teardrop-shaped suspension loops are picked up by a second pair of conveyor elements, are moved away over the smoking or cooking rod which is chucked at one end and finally are placed on the point provided for that purpose on the smoking or cooking rod. Thus a sequential alignment of sausages of desired length is facilitated with standard size teardrop-shaped suspension loops on conventional smoking or cooking rods, and the sausages cut from the string of sausages are immediately lifted out of the area in front of the filling pipe opening to a higher level, so that the area in front of the filling pipe opening remains free and the pinching off or swaging and sealing tools as well as the casing brake ring can be removed unhindered for realignment and reuse of the filling pipe with tubular casing material.

12 Claims, 6 Drawing Sheets

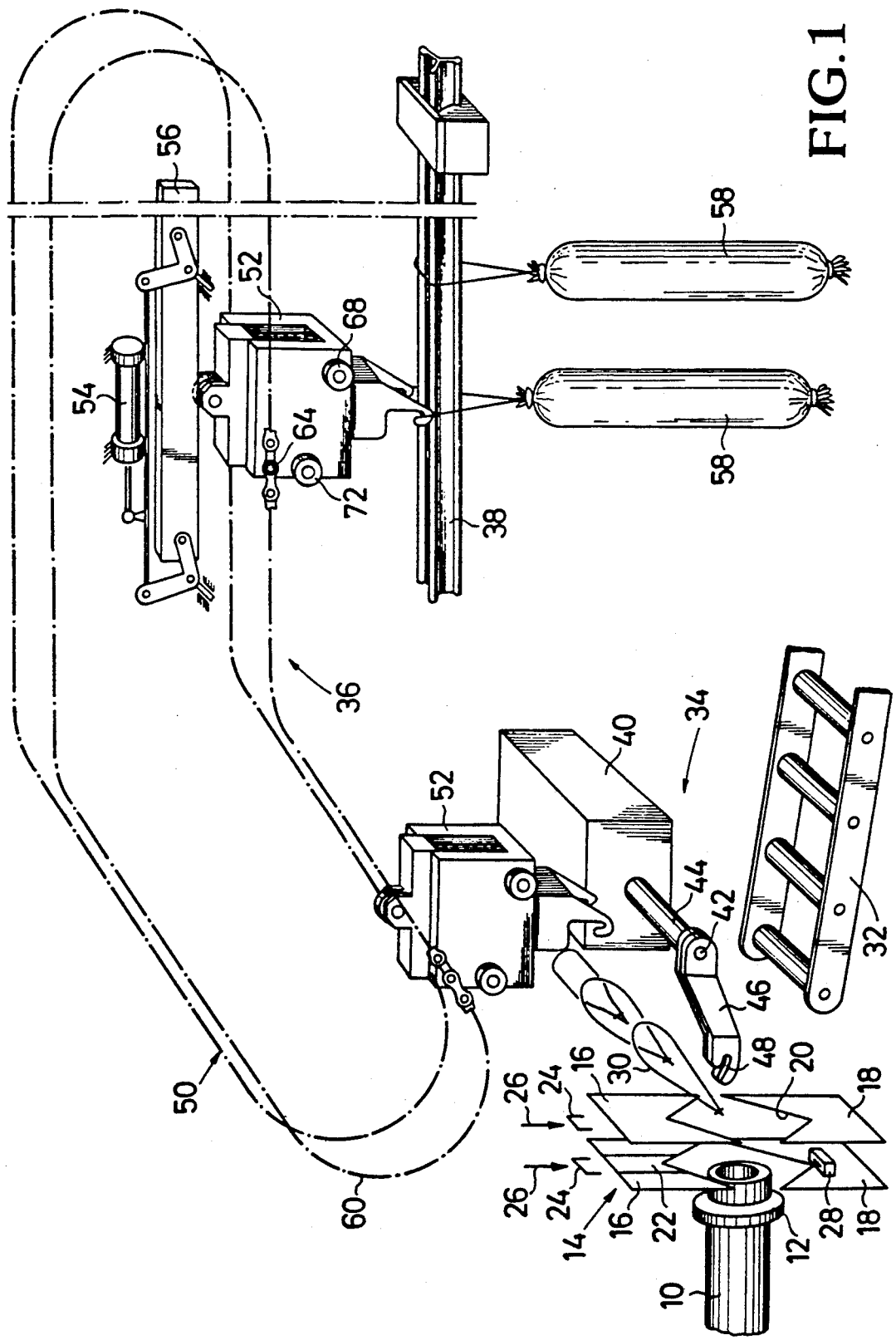

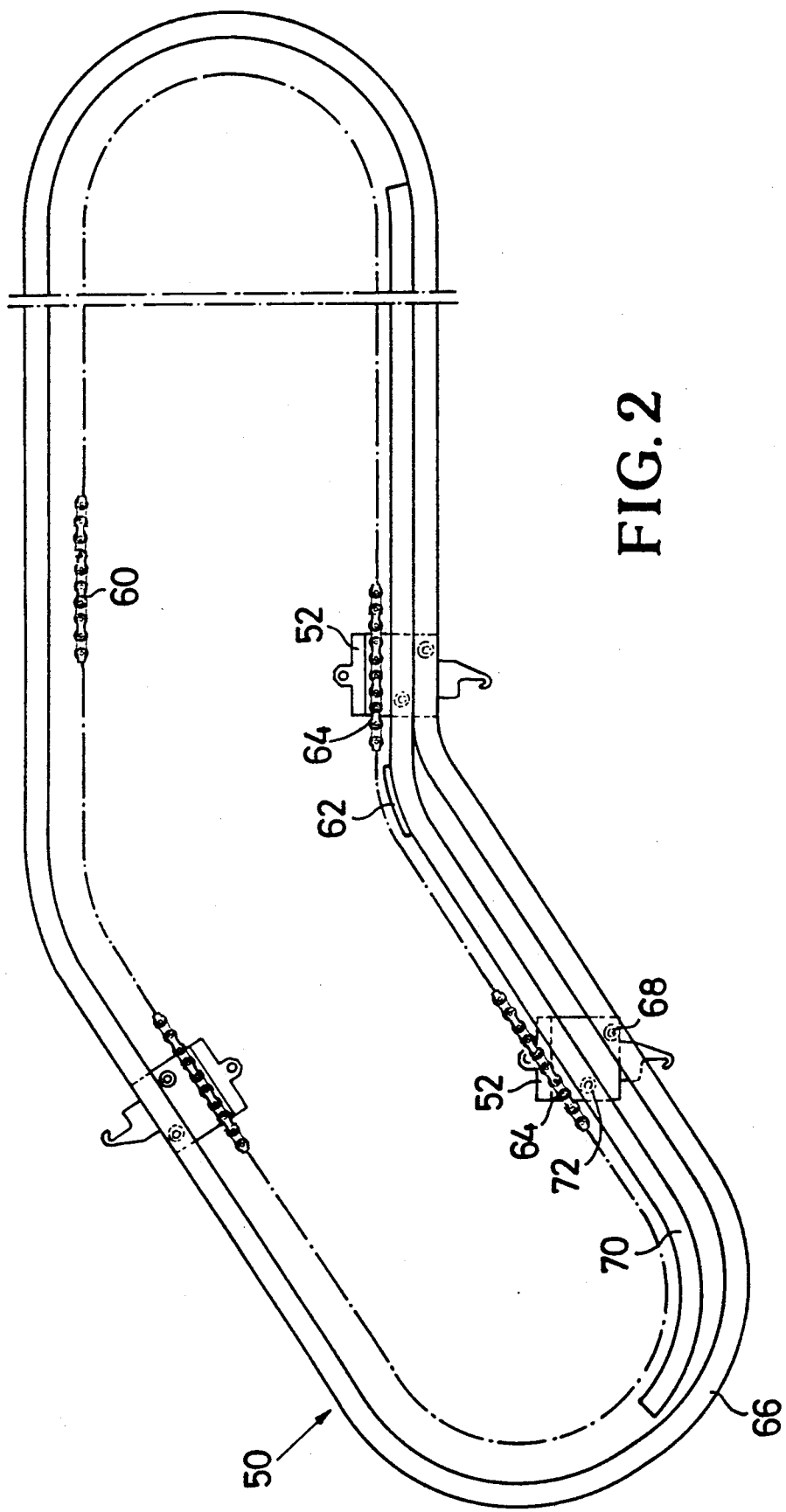

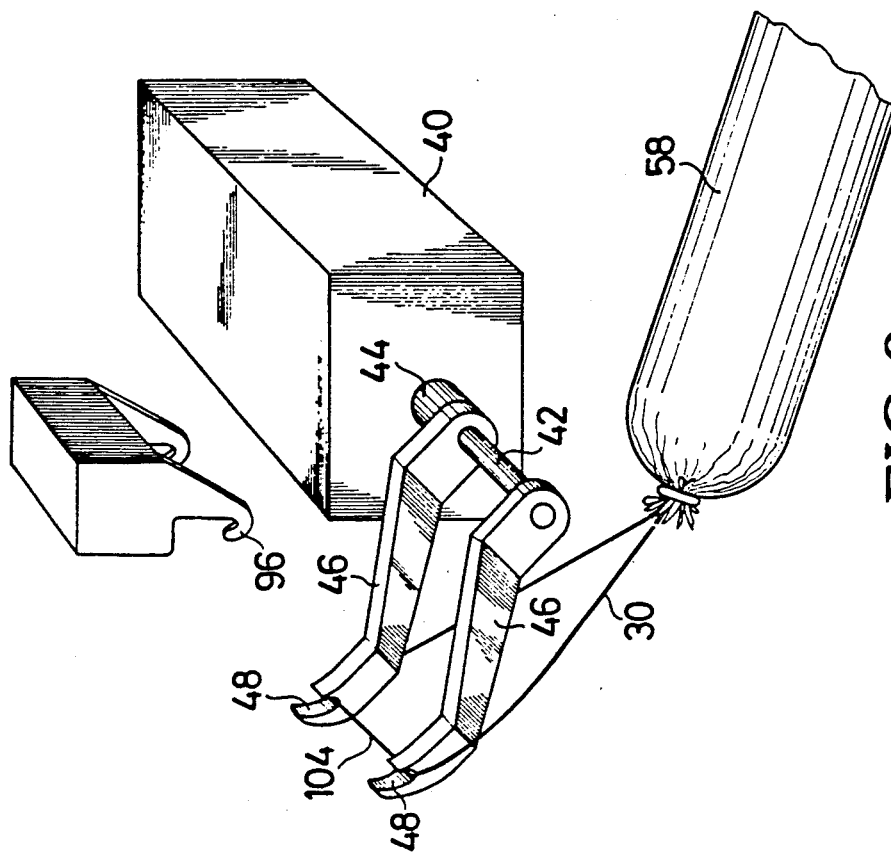
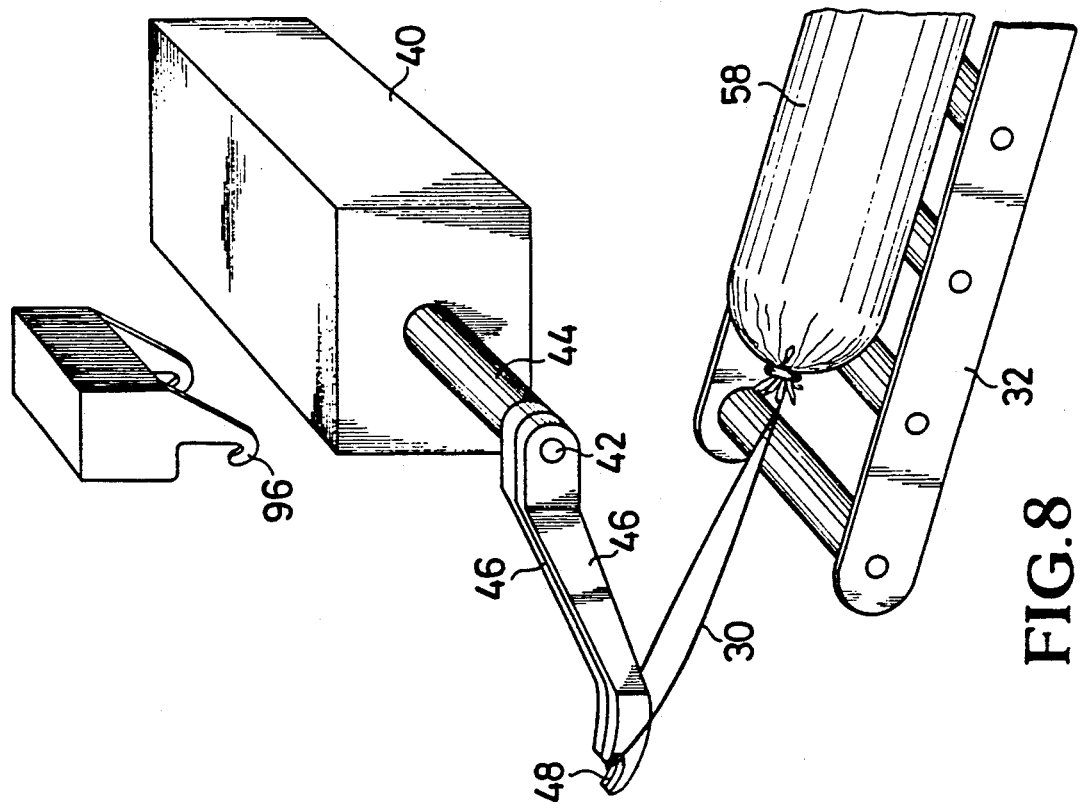

PROCESS AND DEVICE FOR THE MECHANIZED SUSPENSION OF SAUSAGES

The invention relates to the mechanized suspension of individual sausages produced totally by mechanized means with teardrop-shaped suspension loops attached at their ends to smoking or cooking rods, in which the individual teardrop-shaped suspension loops are picked up by the fastening at the end of the sausage, are flared out and are mounted on a smoking or cooking rod, as well as a device for execution of this process.

Such a process is known from German Patent 34 37 830. This patent relates in its entirety generally to the automatic sequential arrangement on holding rods of articles provided with holding eyes which are teardrop-shaped and in its exemplary embodiment shows and describes the sequential arrangement of sausages on a smoking or cooking rod. According to this process the articles are first suspended in uniformly timed sequence on the top strand of a revolving endless belt, and then the chain holder with the holding rod arranged beneath the bottom strand of the chain revolves around its longitudinal axis 180 degrees and finally guides the holding rod axially with the articles suspended thereon. A movable drivable carriage with a hook serves for suspension on the chain, which engages the teardrop-shaped suspension loop seized from the end of a tongue and with the forward thrust of the carriage deposits it on the chain.

The execution of the known process and its device are not free of drawbacks. Thus on account of the required arrangement of the endless chain at a level identical to that of the filling pipe and the narrowing down or swaging and sealing tools of the automatic filling installation for the installation of new tubular casing material on the filling pipe, the entire device must be removed from the filling pipe area each time. Furthermore the teardrop-shaped lifting and suspension loop must be configured to be extremely large, in order to be able to be moved away over the chain drive. For suspension of the sausages the traditional smoking or cooking tubes cannot be used with bulging triangular cross section on the ends of the profiles; special embodiments of triangular bent pieces of sheet metal with a U-shaped opening on a triangular side are required, which then requires additional outlay. Furthermore the sausage length is limited by the arrangement of the smoking or cooking rods to approximately the appropriate level for the filling pipe. Finally for 180 degree revolution, whereby the holding rod is pivoted upward, the endless chain is loaded with the total number of articles or sausages to be suspended on a rod and this must be moved forward in steps, which is to be controlled only with great construction costs and nonetheless still causes considerable vibration during operation.

SUMMARY OF THE INVENTION

Therefore the object of the invention is to provide a process of the aforementioned type as well as a device for its execution, which provides for a sequential arrangement of any desired length of sausages with teardrop-shaped suspension loops of normal size on conventional smoking or cooking rods and by which no removal of the device from the area in front of the filling pipe opening is required for realignment and reuse of the filling pipe.

The invention solves this problem by means of a process in that after being picked up the teardrop-shaped suspension loops are raised out of the discharge area of the filling pipe by a first pair of movable conveyor hooks and simultaneously are flared, whereupon the flared teardrop-shaped suspension loops are then picked up by a second pair of movable conveyor hooks, are guided individually away over the smoking or cooking rod one end of which is chucked in the receiving setting and finally are deposited at the point provided for that purpose on the smoking or cooking rod.

By the process according to the invention the sausages cut off from the string are raised immediately out of the area in front of the filling pipe opening to a higher level and are transported away to the smoking or cooking rod, on which they are suspended individually. Thus the sizes of the teardrop-shaped suspension loops need only correspond to the dimensions of the smoking or cooking rod which is chucked at one end and can have still another means of support along its length as an alternative means of support. The area in front of the filling pipe opening thus remains free of the means for execution of the process according to the invention and allows for unhindered removal of the narrowing down or swaging and sealing tools as well as the casing brake ring in the case of realignment and reuse of the filling pipe with tubular casing material, which also can be carried out more rapidly and can thus contribute to lowering the total time consumed.

According to a first feature for advantageous development of the process according to the invention the flared teardrop-shaped suspension loops are raised further by the second pair of conveyor elements before being guided away over the smoking or cooking rod, so that even extremely long sausages can be accommodated in the area below the smoking or cooking rod.

Still another feature for advantageous development of the process according to the invention provides that the teardrop-shaped suspension loops are deposited on the smoking or cooking rod by means of lowering the second pair of conveyor elements below the top boundary plane of the smoking or cooking rod, so that the teardrop-shaped suspension loops are picked up automatically by the smoking or cooking rod.

A device for execution of the process according to the invention consists primarily of two axial levers, controlled to be able to pivot upward and then for the flaring of the pear-shaped suspension loops to be spread apart from one another, of which the ends are provided with hooking jaws to pick up the suspended teardrop-shaped suspension loops by their fastening to the sausage string, an endless conveyor with at least one conveyor drive element, at the bottom end of which are arranged two hooks with certain transverse spacing, in which the flared casings can be passed over from the hooking jaws of the lever and can be guided away over the smoking or cooking rod, as well as means by which the hooks of the conveyor element can be lowered below the top boundary plane of the smoking or cooking rod. Therefore the levers form a pick-up and lifting device which picks up the individual teardrop-shaped suspension loops and by means of upward pivoting suspends them in the hooks of the conveyor element, while these hooks together with the endless conveyor and the means for lowering the hooks on the smoking or cooking rod form a transport and suspension device, which is mechanically separated from the pick-up and lifting device It is to be understood however in and of itself that the movements of the two devices must be controlled relative to one another, which control is to be performed without any difficulty by means of an electronic control installation. The electronic control can be configured in such a manner and can be programmable so that as tight as possible a suspension on the smoking or cooking rod is guaranteed for sausages of any dimensions.

According to a first feature for advantageous development of the device according to the invention the endless conveyor includes a first rising segment and a second horizontal segment, whereby the smoking or cooking rod is arranged beneath the second segment.

Other features for advantageous configuration of the device according to the invention are disclosed in the following description of one preferred embodiment of a device as shown in the drawing for execution of the process according to the invention. In the drawings:

BRIEF DESCRIPTION OF THE DRAWINGS

FIG. 1 is a simplified perspective representation of the entire device for the mechanical suspension of sausages on a smoking or cooking rod chucked at one end before the filling pipe and the associated sealing tools of an automatic sausage filling installation, FIG. 2 is a simplified side view of the endless conveyor of the device, FIG. 8 is the released sausage with the teardrop-shaped suspension loop for its suspension picked up by the levers of the pick-up and lifting device, FIG. 9 is the sausage being picked up at the teardrop-shaped suspension loop for its suspension during the raising and spreading of the lever.

FIG. 1 shows the filling pipe 10 and the casing brake ring 12 of a conventional automatic sausage filling installation. Furthermore, in a known manner in front of the filling pipe opening is located a double working narrowing or swaging and sealing tool, which includes two pairs of opposing slidable shearing blades 16, 18 with V-shaped cutouts 20 for the swaging or pinching off of the sausage length. The top shearing blade 16 incorporate guides 22 for sealing staples 24, which following the pinching off or swaging are thrust downward by means of staple drive devices symbolically indicated by arrows 26 and are curved down below the string of sausage in dies 28 on the bottom shearing blade 18. A cutting device not shown serves for the separation of the sausage length between the closing staples 24. Furthermore a teardrop-shaped suspension loop feed device is provided which presents a teardrop-shaped suspension loop 30 intended for suspension on the outside pair of shearing plates before the pinching off of a strip (not shown) of teardrop-shaped suspension loops, which during the pinching off or swaging of the sausage length is guided downward and is incorporated therein by means of the sealing staple. A strip of teardrop-shaped suspension loops according to German Patent 31 47 386 can be used for this purpose, in which the lifting and suspension loops, preferably with the gusset ends out, are arranged in a row scoop-like and easily detachable.

Figure 4:
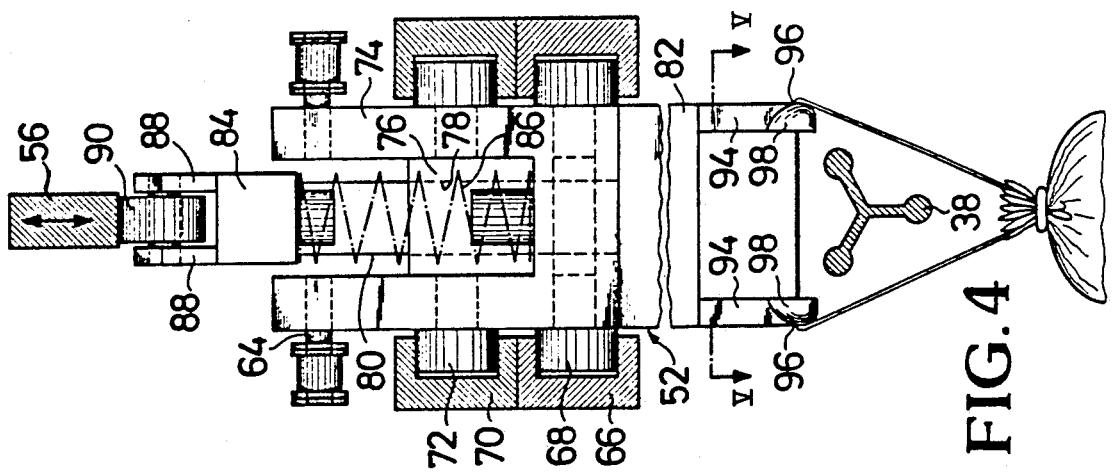
FIG. 4 is a frontal view of the conveyor assembly over the smoking or cooking rod, seen in the direction of conveyance.

An inclined gravity roller conveyor 32 is preferably located before the pinching off or swaging and sealing tool, which is intended to intercept and carry away the cut-off sausage when the shearing plates are opened.

Casing brake ring 12 and pinching off or swaging and sealing tool 14 are mechanically connected with one another and together can be thrust and/or pivoted out of the shown work setting into a release setting, in order to make place for the drawing forward of new tubular casing materials on the filling pipe 10.

Insofar as the arrangement shown in FIG. 1 corresponds to the state of the art it requires no more precise representation and explanation.

Furthermore FIG. 1 shows a device for the mechanical pick-up of the sausages produced with the arrangement described above in diagrammatic representation and its feed onto and suspension on a smoking or cooking rod. The device consists essentially of two parts, including a pick-up and lifting device 34 and a transport and suspension device 36, with which the sausages picked up by the pick-up and lifting device 34 are fed one after the other to a smoking or cooking rod 38 which is chucked at one end and are suspended on this rod at predetermined points.

The pick-up and lifting device 34 has a gearbox 40, out of which project two spindles 42, 44, one coaxially surrounding the other. At the end of each of these spindles 42, 44 is supported an offset lever 46 of the same shape and size which is provided with a hook jaw 48 at the end. With the aid of a drive motor not shown which can be inserted into gearbox 40, levers 46, 48 can be pivoted together out of the original position shown in FIG. 1 360 degrees in clockwise direction, and the levers which were at first tightly adjacent to each other during a first pivot reach of approximately 110 degrees are spread apart from one another by movement of outside spindle 44 into the gearbox. After a predetermined rest pause the levers are pivoted back around the remaining 250 degrees into the original setting, and the spreading apart from one another becomes retrogressive. The configuration of such a gearing is common knowledge to a gear expert and thus require no precise explanation.

The transport and suspension device 36 consists mainly of an endless conveyor 50 with a plurality of conveyor members 52 arranged at certain spacing thereon as well as a stationary pressure beam 56 which can be lowered by a working cylinder 54, which controls the hanging of the sausage 58 on smoking or cooking rod 38 with one end chucked.

Endless conveyor 50 has two endless conveying chains 60 arranged at some spacing from one another, which are guided over chain wheels (not shown) and each has a curved guide member 62 as well (FIG. 2) so that the two chain strands extend first from one end of the endless conveyor, adjacent to pick-up and lifting device 34, obliquely upwards and then run horizontal to the other end over the chucked smoking or cooking rod 38. Because of this, the top strand can be steered by another chain wheel (not shown) out of the oblique position into the horizontal, while this takes care of the selected guide member 62 for the bottom strand, which can consist of an automatically lubricating wear-resistant plastic such as polytetrafluoroethylene. Any desired motor such as especially a transmission brake motor or a step motor can be used to drive conveyor chains 60, that is, any motor which incorporates practically no slow-down inclination.

Conveyor members 52 are arranged between the two conveyor chains 60 and connected on both sides in the vicinity of an open corner by connecting bolts 64 articulated with said conveyor chains 60. As shown in FIG. 2, each conveyor chain 60 is encircled around its entire periphery by a first U-shaped guideway or track 66. The two first guideways or tracks 66 have the sam path and in their opposing jaw openings each takes a first guiding pulley or contact roller 68 on the relevant side of the conveyor member 52, which is there placed rotatably diametrical to the connecting bolt 64. Between the bottom strand of each conveyor chain 60 and the relevant first guideway or track 66 is arranged a second U-shaped guideway or track 70. Also the two second guideways or tracks 70 follow the same path and each takes in its jaw opening opposing the other a second guiding pulley or contact roller 72 on the relevant side of conveyor member 52, which is placed there rotatably beneath connecting bolt 64 at approximately half the height between connecting bolt 64 and the first guiding pulley or contact roller 68 (cf. especially FIG. 3). In the obliquely upward directed part 50a of endless conveyor 50, the first guideways or tracks 66 and the second guideways or tracks 70 have an enlarged spacing relative to one another, so that conveyor members 52 take the same position in the entire bottom area of endless conveyor 50.

Figure 5:
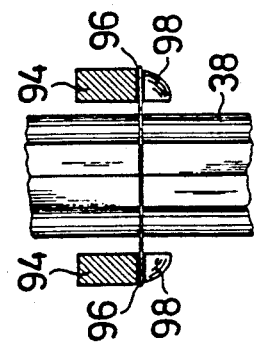
FIG. 5 is a horizontal cross section through the hook of the conveyor assembly along line V—V of FIG. 4.
Figure 3:
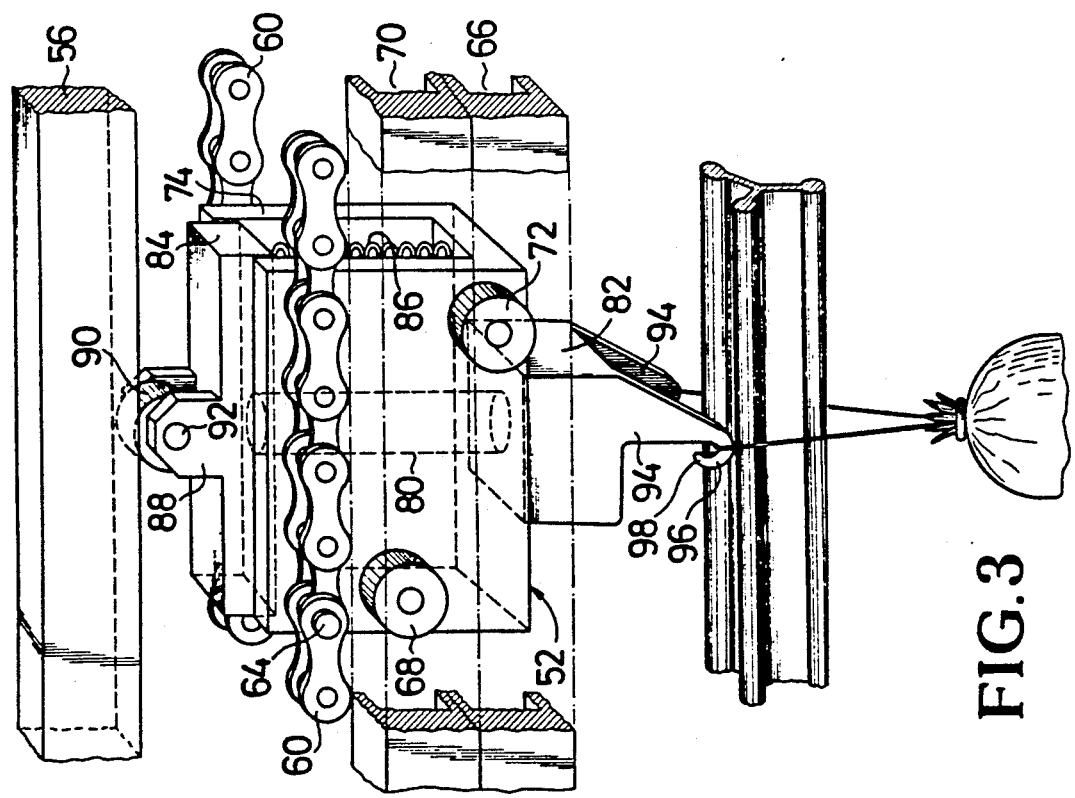
FIG. 3 is an enlarged perspective representation of a conveyor assembly of the endless conveyor during transport of the sausage.

The arrangement of conveyor members 52 is shown in FIGS. 3, 4 and 5. Each conveyor member 52 has a housing 74 which is U-shaped in cross section, on the outside of which are mounted rotatable connecting bolts 64 for conveyor chain 60 and guiding pulleys or contact rollers 68, 72. The longitudinal midline of crossbar or base of housing 74, where it can be reinforced, as is indicated in FIG. 4 by reference 76, includes a perpendicular guide bore 78 for the movable housing of a rod 80, of which the bottom end carries a block 82. At the top end of rod 80 is fastened a beam-like pressure member 84, which fits in the jaw opening of U-shaped housing 74. Two compression springs 86, which are stretched on both sides of rod 80 between the bottom of housing 74 and pressure member 84, press member 84 upward until block 82 abuts against the bottom of housing 74, and the bottom end of pressure member 84 is still located within the jaw opening of housing 74. At the top of pressure member 84 there are two vertical strips 88 between which are rotatably mounted a pressure roll 90 cooperating with pressure beam 56 by means of a bolt 92.

On its bottom, block 82 supports two triangular side walls 94 which are at some spacing from one another, of which the bottom ends are bent upward and form hooks 96. The upward bent hook ends 98 taper, as shown in FIGS. 4 and 5, by means of a suitable curvature to the outside and also upward and also horizontally outward and are smoothed and buffed on the curved outsides.

Furthermore a not shown electronic control is part of the described device, which alternately controls the drive motors for the devices 34 and 36 as well as the working cylinder 54 for the operation of pressure beam 56 and coordinates with the operation of the automatic filling arrangement and the pinching off or swaging and sealing tool as well as the feed of teardrop-shaped suspension loops according to a predetermined program, which is adapted in turn to the required dimensions of the sausage and with a variation of the dimensions can be changed in a simple manner.

Figure 6:
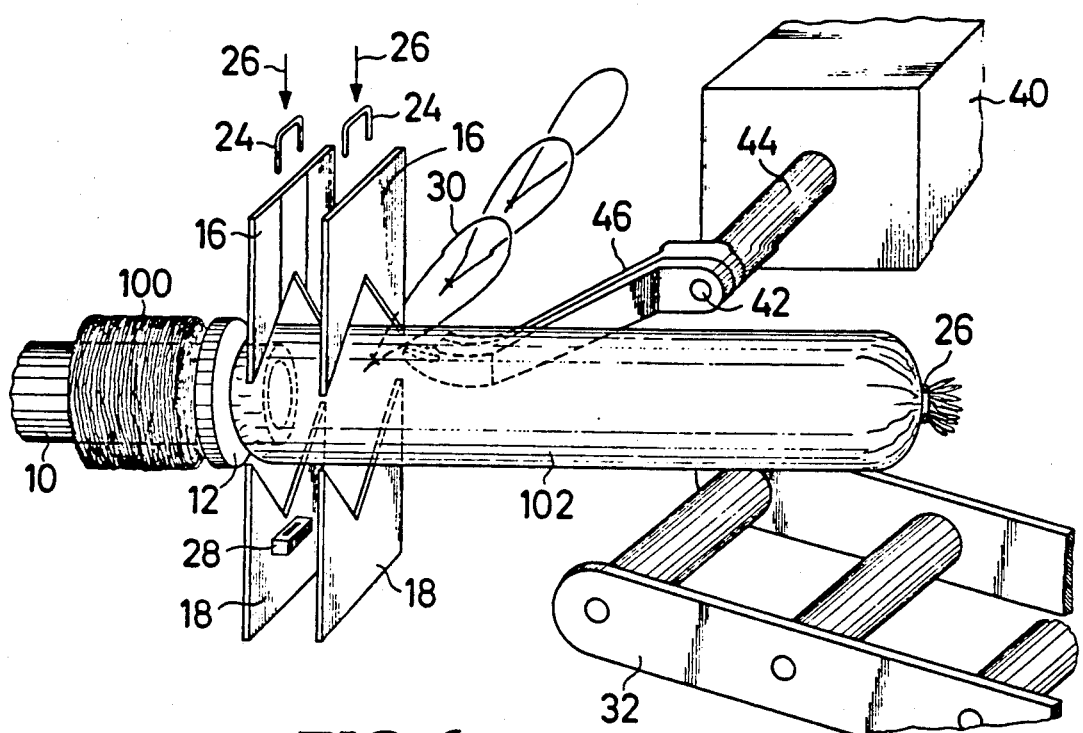
FIG. 6 is a larger scale view of a cutout of FIG. 1 during the filling of tubular casing material to form a string of sausage.

The method of operation of the described arrangement with the mechanical sausage suspension device is the following:

It is assumed that, as shown in FIG. 6, a supply of tubular casing material is stored in the configuration of a so-called tubular casing shirring 100 on the filling pipe 10, of which the end which has been drawn through the casing brake ring 12 beyond the filling pipe opening is sealed by a sealing staple 24. The shearing plates 16, 18 take their open setting, and a teardrop-shaped lifting and suspension loop 30, of which the other end still adheres to the (not shown) suspension loop strip, projects with its opened gusset end in the area of the outside pair of shearing plates Levers 46 of pick-up and lifting device 34 take their original setting directed toward the left, in which they lie tightly adjacent to one another and their hook jaws 48 engage and grasp from below directly on the one arm of teardrop-shaped lifting and suspension loop 30. Conveyor chains 60 are located in a setting in which a conveyor member 52 at the beginning of the obliquely upward directed segment of endless conveyor 50 and stand still. A smoking or cooking rod 38 which is empty or is even already partially filled with sausages is chucked tightly beneath the straight segment 50b of the endless conveyor with its end which is furthest distant from the automatic filling installation.

Figure 7:
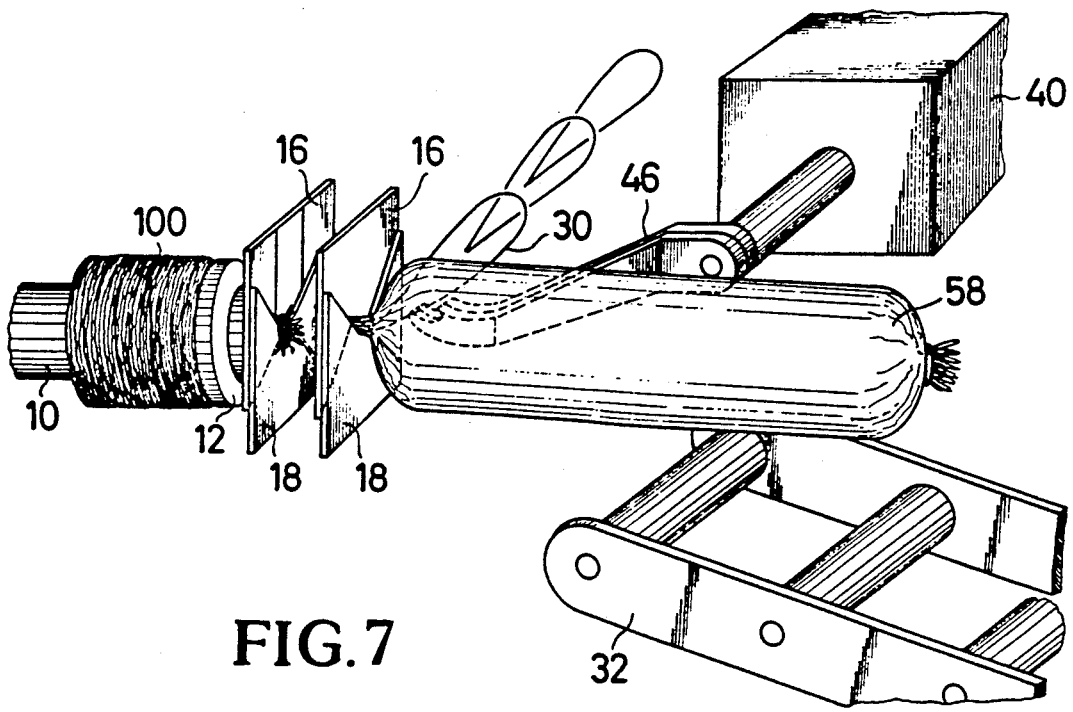
FIG. 7 is the same cutout following the sealing of the sausage string in front of the filling pipe opening and the separation of a sausage, before said sausage is released from the narrowing down or swaging and sealing tool.

Now when the automatic filler is connected, sausage material enters under pressure into the closed part of the tubular casing material being sealed and drawn through the casing brake ring 12 and fills the tubular casing material while this continues to be drawn away into a sausage length 102 (FIG. 6), of which the length is determined by the length of the cycle of connection of the automatic filling installation. Following completion of each cycle the pairs of shearing plates 16, 18 close and pinch off the sausage length directly in front of the opening of filling pipe 10. Then the clamp operators 26 are operated pneumatically or hydraulically and seal each narrowed or swaged length of sausage with a staple 24 at two points lying one after the other, between which the sausage string then is cut through by the (not shown) cutting device (FIG. 7).

With the closing of the front pair of shearing plates the ready teardrop-shaped lifting and suspension loop 30 is completely released from the teardrop-shaped suspension loop strip and picked up by hook jaws 48 of lever 46. The gusset end of teardrop-shaped lifting and suspension loop 30 is fastened with the front closing staple 24 to the sausage string and remains tight following separation of the string at the far end of sausage 58 which has thus been separated. As soon now as the pair of shear plates open again, the separated sausage 58 drops on gravity-roller conveyor 32 and is inclined to roll away on this from the pinching off and sealing tool 14, and the teardrop-shaped suspension loop seized by hook jaws 48 of lever 46 draws it taut (FIG. 8).

Now the motor in gearbox 40 is connected, and spindles 42, 44, are rotated under simultaneous axial thrust of outside spindle 44 and spindles 42, 44 are rotated around approximately 110 degrees As a result of this movement levers 46 are pivoted upward and simultaneously spread apart (FIG. 9), whereupon a straight horizontal teardrop-shaped suspension loop segment 104 is formed between hook jaws 48. At the end of this pivot movement levers 46 have greater spacing than hooks 96 on conveyor members 52 which are in operation there and they suspend that teardrop-shaped suspension loop 104 in hooks 96.

Now with levers 46 stationary the drive of conveyor chains 60 is connected, whereupon conveyor members 52 are moved in segment 50a of endless conveyor 50 obliquely upward and teardrop-shaped suspension loop 30 for suspension is pulled with sausage 58 suspended thereon out of hook jaws 48 of levers 46. As soon as sausage 58 is conveyed out of the pivot area of levers 46, the motor for gearbox 40 is reconnected, and levers 46 are pivoted further in the same direction of rotation as before until they have again reached their original setting, while they are again moved simultaneously axially in opposite directions.

Figure 11:
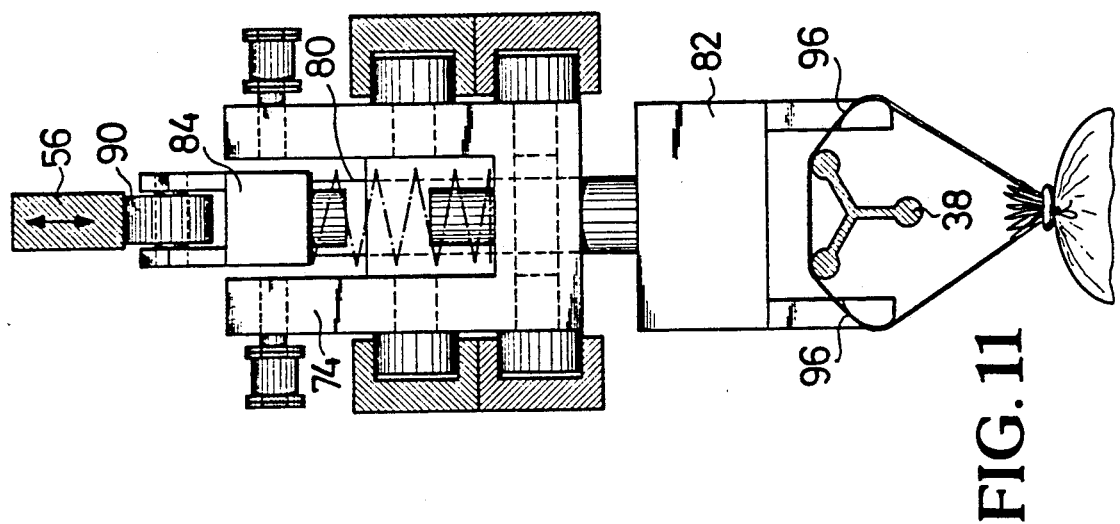
FIG. 11 is the same in frontal view of the conveyor assembly the same as in FIG. 4 showing the suspension of the sausage on the smoking or cooking rod.
Figure 10:
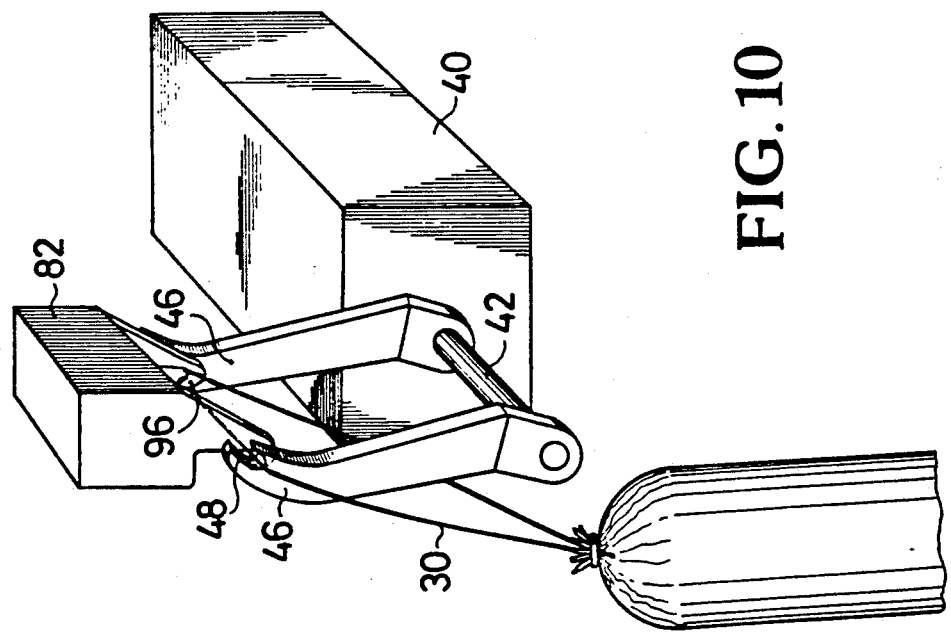
FIG. 10 is the transfer of the flared teardrop-shaped suspension loop for suspension from the levers on the hooks of a conveyor assembly.

At guide member 62, the upward movement of conveyor member 52 is guided over into a horizontal movement (FIG. 2), while by that same conveyor assembly the sausage 58 suspended on hook 96 is moved away with its flared teardrop-shaped lifting and suspension loop 30 over the smoking or cooking rod 38. As soon as the suspension point on this rod is reached, pressure beam 56 is lowered with the aid of the working cylinder and through the compression roll 90 presses pressure member 84 downward into the jaw opening of housing 74. Rod 80 and block 82 are thus also moved downward with hooks 96, and teardrop-shaped lifting and suspension loop 30 is deposited with its part running between hooks 96 on the smoking or cooking rod 38. Thus, as shown in FIG. 11, teardrop-shaped lifting and suspension loop 30 is raised out of hooks 96 and may be slid out of the hooks over the tapering hook ends 98, while conveyor member 52 with hook 96 continues its movement along the smoking or cooking rod, until another conveyor assembly has reached the pick-up point as shown in FIGS. 1 and 10 over levers 46. With each new sausage being guided away over smoking or cooking rod 38, the lowering of pressure beam 56 occurs somewhat earlier, until the smoking or cooking rod is completely loaded.

The spacing between two sequential conveyor members 52 is preferably approximately the same as the length of conveyor chains 60 between the aforementioned transfer point over lever 46 and the chucked end of smoking or cooking rod 38. With suitable control of the drive for conveyor chains 60 however a shorter spacing is also possible, in which then the transfer of a sausage from levers 46 to hooks 96 of conveyor member 52 already occurs before the sausage suspended on the conveyor assembly which is running at the front is suspended on the smoking or cooking rod. In any case the spacing between two conveyor carriages must nonetheless be greater than the unoccupied length of the smoking or cooking rod, in order to avoid the case wherein with the suspension of a sausage in the vicinity of the chucked end of the rod the next sausage is suspended at the opposite end.

As shown in FIG. 1, the area before the pinching off or swaging and sealing tool over the gravity-roller conveyor 32 is free, so that the pinching off or swaging and sealing tool 14 with casing brake ring 12 can be removed unhindered from filling pipe 10 when new tubular casing material must be drawn onto the filling pipe. Furthermore the smoking or cooking rod 38 is located at a considerably higher level than filling pipe 10, so that even extremely long sausages, such as especially those also having larger dimensions, can be suspended without hindrance. When smoking or cooking rod 38 is completely filled with suspended sausages, with the aid of a (not shown) robot it can be guided over into the smoking or cooking wagon and an empty rod can be chucked in the holder. The described suspension device however can also be used in connection with an automatic feed and discharge device for smoking or cooking rods, as is represented and described in the previous application P 39 30 876.

We claim:

1. Process for the mechanized suspension on smoking or cooking rods of individual sausages produced in an automatic filling installation having a teardrop-shaped suspension loop fastened to an end thereof, in which during fastening to the sausage ends the individual teardrop-shaped suspension loops are picked up, flared and mounted on a smoking or cooking rod, said process comprising, picking up each of a plurality of teardrop-shaped suspension loops;

lifting each of the teardrop-shaped suspension loops by a first pair of movable conveyor hooks out of a discharge area of a filling pipe and simultaneously flaring each of the teardrop-shaped suspension loops;

engaging each of the flared teardrop-shaped suspension loops by a second pair of movable conveyor hooks which take each of the flared teardrop-shaped suspension loops from the first conveyor hooks;

guiding each of the flared teardrop-shaped suspension loops individually over a smoking or cooking rod which is chucked at one end in a mounting setting; and depositing each of the flared teardrop-shaped suspension loops on the smoking or cooking rod.

2. Process as in claim 1, further comprising the step of lifting each of the flared teardrop-shaped suspension loops by the second pair of conveyor hooks before being guided over the smoking or cooking rod.

3. Process as in claim 1, wherein said depositing of the teardrop-shaped suspension loops on the smoking or cooking rod comprises lowering the second pair of conveyor hooks below a top boundary plane of the smoking or cooking rod.

4. Device for the mechanized suspension on smoking or cooking rods of individual sausage produced in an automatic filling installation and having teardrop-shaped suspension loops fastened to an end thereof, said device comprising:

two controlled levers which are upwardly pivotal and can be axially spread apart to flare the teardrop-shaped lifting and suspension loops attached to the sausages, the two controlled levers having ends provided with hook jaws for grasping the teardrop-shaped lifting and suspension loops when the loops are fastened on a sausage string;

an endless conveyor with at least one controlled revolving conveyor member, the revolving conveyor member having a bottom end including two hooks, the two hooks having transverse spacing which allows flared suspension loops to be picked up from the hook jaws of the levers and guided away over a smoking or cooking rod; and means for lowering a conveyor member under control below a top boundary plane of a smoking or cooking rod.

5. Device as in claim 4, wherein said endless conveyor includes a first rising segment and a second horizontal segment, and the smoking or cooking rod is chucked at one end beneath the second segment.

6. Device as in claim 4, wherein said endless conveyor comprises a plurality of conveyor members arranged on the endless conveyor at a spacing around a periphery thereof such that said conveyor members are separated by spaces which are greater than the length of the smoking or cooking rod on which the sausages are deposited.

7. Device as in claim 6, wherein said endless conveyor has two parallel endless chains between which are suspended the conveyor members.

8. Device as in claim 7, wherein the conveyor members are guided by conveyor chains surrounding U-shaped guideways or tracks.

9. Device as in claim 8, wherein guide pulleys or contact rollers are arranged on both sides of the conveyor members, said guide pulleys or contact rollers being guided in a second U-shaped guideway or track which extends only over bottom strands of the conveyor chains and runs in such a manner relative to the first guideway or track that the conveyor members run along the bottom strands of the conveyor chains with the hooks of the conveyor members extending perpendicularly downward.

10. Device as in claim 8, wherein each of the conveyor members include a rod, a block connected to a bottom end of the rod and connected to the two hooks of each of conveyor members, a pressure member connected to the top of the rod which is urged upward by a spring, a housing in which the rod, block and pressure member can be moved downward counter to spring bias, a pressure roll rotatably mounted between two vertical strips at the top of the pressure member, and a stationary horizontal pressure bean which in cooperation with the pressure roll, rod, block, and pressure member is capable of moving downward for the placement of the teardrop-shaped lifting and suspension loops on the smoking or cooking rod.

11. Device as in claim 4, wherein said device includes:

a gearbox having two spindles including ends and the levers are arranged at the ends of the two driven spindles so that one of said spindles surrounds the other of said spindles and both spindles together can be rotated in two steps around an entire 360 degrees, means for axially spreading apart said spindles when said spindles are rotated to one position, and means for bringing said spindles together when said spindles are rotated to a second position.

12. Device as in claim 11, wherein said levers of said spindles are each bent in two offset steps.

* * * * *